United States Patent
Hashimoto (10) Patent No.: US 9,432,936 B2
(45) Date of Patent: Aug. 30, 2016

(54) PORTABLE ELECTRONIC DEVICE

(71) Applicant: KYOCERA CORPORATION, Kyoto-shi, Kyoto (JP)

(72) Inventor: Sunao Hashimoto, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/634,692

(22) Filed: Feb. 27, 2015

(65) Prior Publication Data

US 2015/0181518 A1 Jun. 25, 2015

Related U.S. Application Data (63) Continuation-in-part of application No. PCT/JP2013/073215, filed on Aug. 29, 2013.

(30) Foreign Application Priority Data

Aug. 30, 2012 (JP) ................................ 2012-190657

(51) Int. Cl.
| | |
|---|---|
| H04M 1/00 | (2006.01) |
| H04W 52/02 | (2009.01) |
| H04W 36/14 | (2009.01) |
| H04W 88/06 | (2009.01) |
| H04W 48/16 | (2009.01) |

(52) U.S. Cl.
CPC ......... *H04W 52/0209* (2013.01); *H04W 36/14* (2013.01); *H04W 48/16* (2013.01); *H04W 88/06* (2013.01); *Y02B 60/50* (2013.01)

(58) Field of Classification Search
CPC .............................. H04W 88/06; H04W 36/04
USPC ..................... 455/552.1, 436, 440, 444, 450; 370/328, 329, 331
See application file for complete search history.

(56) References Cited

U.S. PATENT DOCUMENTS

| | | | |
|---|---|---|---|
| 7,454,215 B2 | 11/2008 | Hamano et al. | |
| 7,949,339 B2 | 5/2011 | Hamano et al. | |
| 7,983,683 B2 | 7/2011 | Hamano et al. | |
| 8,340,673 B2* | 12/2012 | Lin ....................... | H04W 68/12 370/328 |
| 8,369,281 B2* | 2/2013 | Denny ................. | H04W 24/04 370/328 |
| 8,374,613 B2* | 2/2013 | Laroia .................. | H04W 16/12 455/440 |

(Continued)

FOREIGN PATENT DOCUMENTS

| | | |
|---|---|---|
| JP | 2005-26878 A | 1/2005 |
| JP | 2009-303234 A | 12/2009 |

(Continued)

OTHER PUBLICATIONS

Office Action mailed Mar. 24, 2015, corresponding to Japanese patent application No. 2012-190657, for which an explanation of relevance is attached.

*Primary Examiner* — Sonny Trinh
(74) *Attorney, Agent, or Firm* — Hauptman Ham, LLP (57) ABSTRACT

According to an embodiment of the disclosure, a portable electronic device provided with: a first communication module configured to perform communication by a first communication standard; a second communication module configured to perform communication by a second communication standard; and a control module configured to use the second communication module to search for a base station, based on traffic of communication performed by the first communication module.

12 Claims, 6 Drawing Sheets

(56) References Cited

U.S. PATENT DOCUMENTS

| | | | |
|---|---|---|---|
| 8,478,271 B1* | 7/2013 | Lee | H04W 76/026 455/414.4 |
| 8,554,886 B2 | 10/2013 | Kanno et al. | |
| 2005/0090262 A1 | 4/2005 | Hamano et al. | |
| 2008/0119196 A1 | 5/2008 | Hamano et al. | |
| 2008/0119199 A1 | 5/2008 | Hamano et al. | |
| 2011/0055363 A1 | 3/2011 | Kanno et al. | |
| 2012/0320744 A1 | 12/2012 | Furuya | |

FOREIGN PATENT DOCUMENTS

| | | |
|---|---|---|
| JP | 2011-55124 A | 3/2011 |
| JP | 2011-244280 A | 12/2011 |
| WO | 2004/023741 A1 | 3/2004 |
| WO | 2011/111452 A1 | 9/2011 |

* cited by examiner

PORTABLE ELECTRONIC DEVICE

CROSS-REFERENCE TO RELATED APPLICATION

The present application is a Continuation-In-Part application of PCT international application Ser. No. PCT/JP2013/073215 filed on Aug. 29, 2013 which designates the United States, incorporated herein by reference, and which is based upon and claims the benefit of priority from Japanese Patent Application No. 2012-190657 filed on Aug. 30, 2012, the entire contents of which are incorporated herein by reference.

FIELD

The present disclosure relates to a portable electronic device.

BACKGROUND ART

Portable electronic devices may perform wireless communication by some communication standards. Such portable electronic devices may perform communication by some wireless communication standards. For example, the wireless communication standards include cellular phone communication standards, and other wireless communication standard.

SUMMARY

According to an embodiment of the disclosure, a portable electronic device provided with: a first communication module configured to perform communication by a first communication standard; a second communication module configured to perform communication by a second communication standard; and a control module configured to use the second communication module to search for a base station, based on traffic of communication performed by the first communication module.

DETAILED DESCRIPTION

Embodiments of the present disclosure are described in detail with reference to the drawings. In the following description, a smartphone is described as one of some examples of a portable device provided with a touch-screen display.

Figure 1:
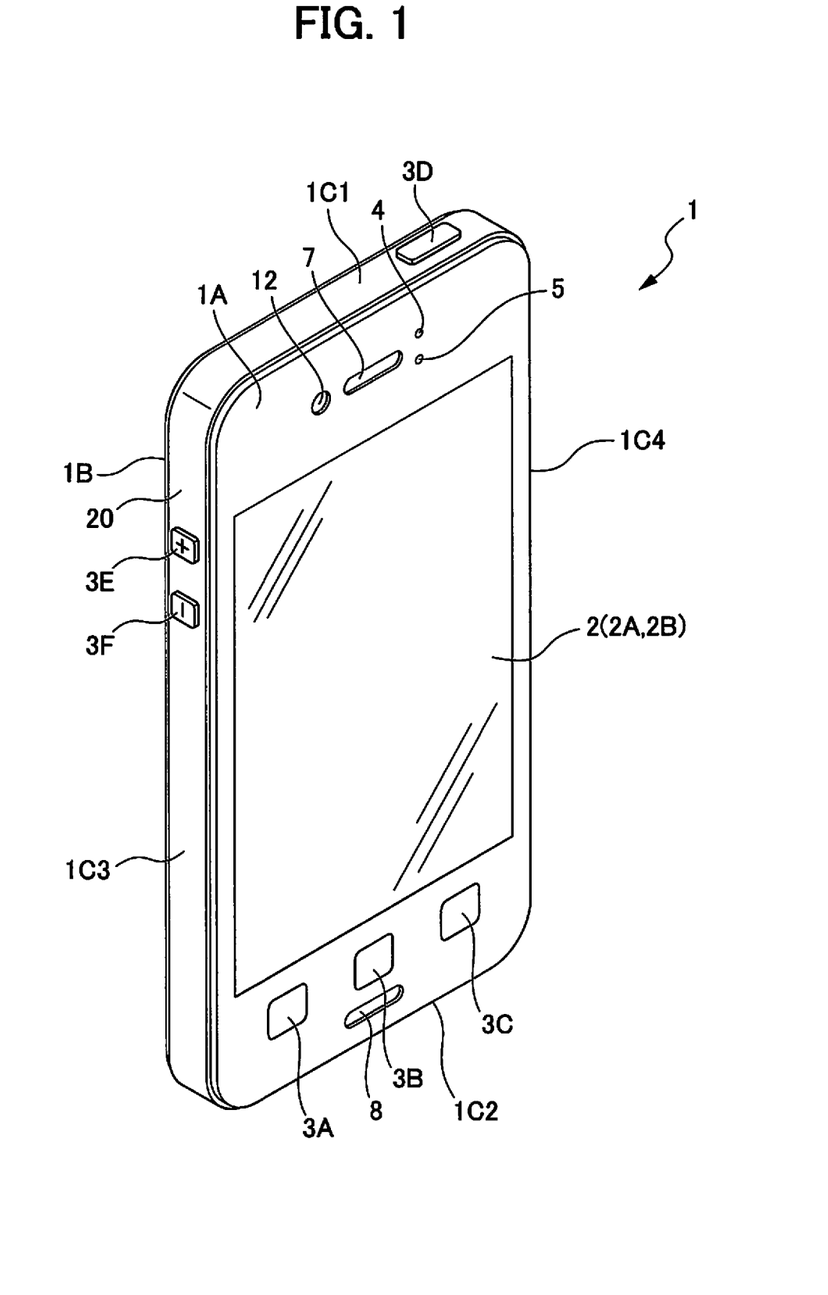
FIG. 1 is a perspective view showing an external appearance of a smartphone according to a present embodiment.
Figure 2:
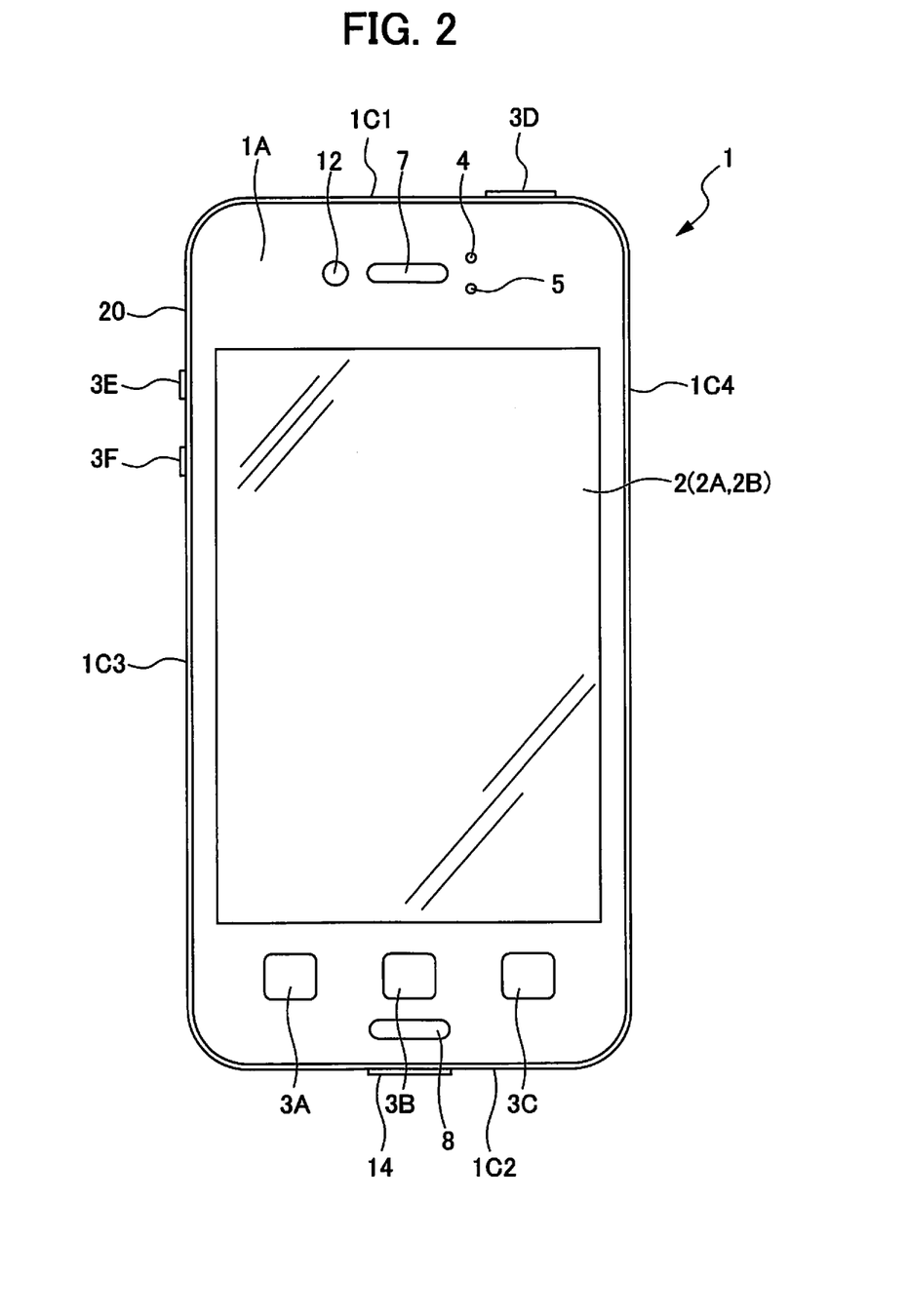
FIG. 2 is a front view showing the external appearance of the smartphone according to a present embodiment.
Figure 3:
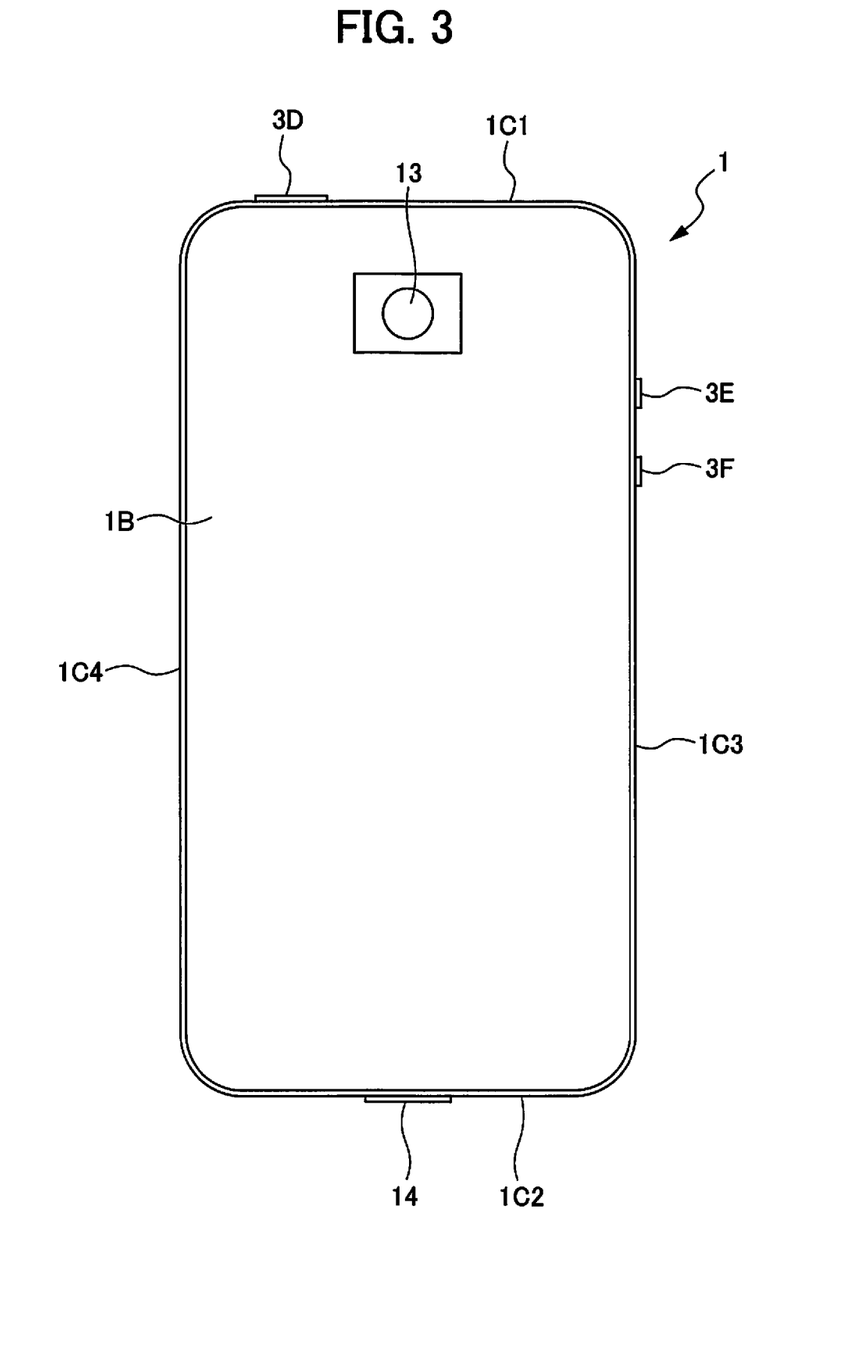
FIG. 3 is a rear view showing the external appearance of the smartphone according to a present embodiment.

An external appearance of a smartphone 1 according to one of some embodiments is described with reference to FIGS. 1 to 3. As shown in FIGS. 1 to 3, the smartphone 1 may comprises a housing 20. The housing 20 may comprises a front face 1A, a back face 1B, and side faces 1C1 to 1C4. The front face 1A is a front face of the housing 20. The back face 1B is a back face of the housing 20. The side faces 1C1 to 1C4 are side faces which connect the back face 1B and the front face 1A. In the following description, the side faces 1C1 to 1C4 may be generally referred to as a side face 1C without identifying which one of faces.

The smartphone 1 may comprise a touch-screen display 2, buttons 3A to 3C, an illuminance sensor 4, a proximity sensor 5, a receiver 7, a microphone 8, and a camera 12, in the front face 1A. The smartphone 1 may comprises a camera 13 in the back face 1B. The smartphone 1 may comprises buttons 3D to 3F and an external interface 14 in the side face 1C. In the following description, the buttons 3A to 3F may be generally referred to as a button 3 without identifying which one of buttons.

The touch-screen display 2 may comprises a display 2A and a touch screen 2B. The display 2A may comprise display devices such as a liquid crystal display, an organic EL (electroluminescence) panel, or an inorganic EL panel. The display 2A can display characters, images, symbols, graphics, etc.

The touch screen 2B can detect a touch to the touch-screen display 2 by a finger, a stylus pen, or the like. The touch screen 2B can detect a position where a plurality of fingers, a stylus pen or the like touch the touch-screen display 2.

The detection method for the touch screen 2B may be an arbitrary method such as a capacitive sensing method, a resistive film method, a surface acoustic wave method (or an ultrasonic sensing method), an infrared ray method, an electromagnetic induction method, and a load detection method. In order to simplify the following description, the finger, stylus pen or the like may be simply referred to as "finger", of which touch to the touch-screen display 2 is detected by the touch screen 2B.

The smartphone 1 distinguishes types of gestures based on a touch, a touched position, a touch period of time, or the number of touch operations, which are detected by the touch screen 2B. A gesture is an operation performed for the touchscreen display 2. Gestures distinguished by the smartphone 1 may include a touch, a long touch, a release, a swipe, a tap, a double tap, a long tap, a drag, a flick, a pinch-in, a pinch-out, etc.

A touch is a gesture of a finger to touch the touchscreen display 2 (for example, to a surface thereon. The smartphone 1 distinguishes the gesture of a finger to touch the touch-screen display 2 as a touch. A long touch is a gesture of a finger to touch the touch-screen display 2 for at least a certain period of time. The smartphone 1 distinguishes the gesture of a finger to touch the touch-screen display 2 for at least a certain period of time as a long touch.

A release is a gesture of a finger to separate from the touch-screen display 2. The smartphone 1 distinguishes the gesture of a finger to separate from the touch-screen display 2 as a release. A swipe is a gesture of a finger to move on while touching the touch-screen display 2. The smartphone 1 distinguishes the gesture of a finger to move on while touching the touch-screen display 2 as a swipe.

A tap is a consecutive gesture of touch and release. The smartphone 1 distinguishes the consecutive gesture of touch and release as a tap. A double tap is a gesture of repeating a consecutive gesture of touch and release two times. The smartphone 1 distinguishes the gesture of repeating a consecutive gesture of touch and release two times as a double tap.

A long tap is a consecutive gesture of a long touch and release. The smartphone 1 distinguishes the consecutive gesture of a long touch and release as a long tap. A drag is a gesture of swiping from a starting point where a movable object is displayed. The smartphone 1 distinguishes the gesture of swiping from a starting point where a movable object is displayed, as a drag.

A flick is a consecutive gesture of touch and release of a finger while moving at high speed in one direction. The smartphone 1 distinguishes the gesture of touch and release of a finger while moving at high speed in one direction as a flick. The flick includes: an upward flick of a finger moving in an upward direction on the screen; a downward flick of a finger moving in a downward direction on the screen; a rightward flick of a finger moving in a rightward direction on the screen; a leftward flick of a finger moving in a leftward direction on the screen; etc.

A pinch-in is a gesture of a plurality of fingers swiping in mutually approaching directions. The smartphone 1 distinguishes the gesture of a plurality of fingers swiping in mutually approaching directions as a pinch-in. A pinch-out is a gesture of a plurality of fingers swiping in mutually separating directions. The smartphone 1 distinguishes the gesture of a plurality of fingers swiping in mutually separating directions as a pinch-out.

The smartphone 1 may be operated in accordance with these gestures that are distinguished via the touch screen 2B. Therefore, operability may be intuitive and easy-to-use for a user. An operation performed by the smartphone 1 in accordance with a distinguished gesture differs depending on a displayed screen displayed on the touch-screen display 2.

Figure 4:
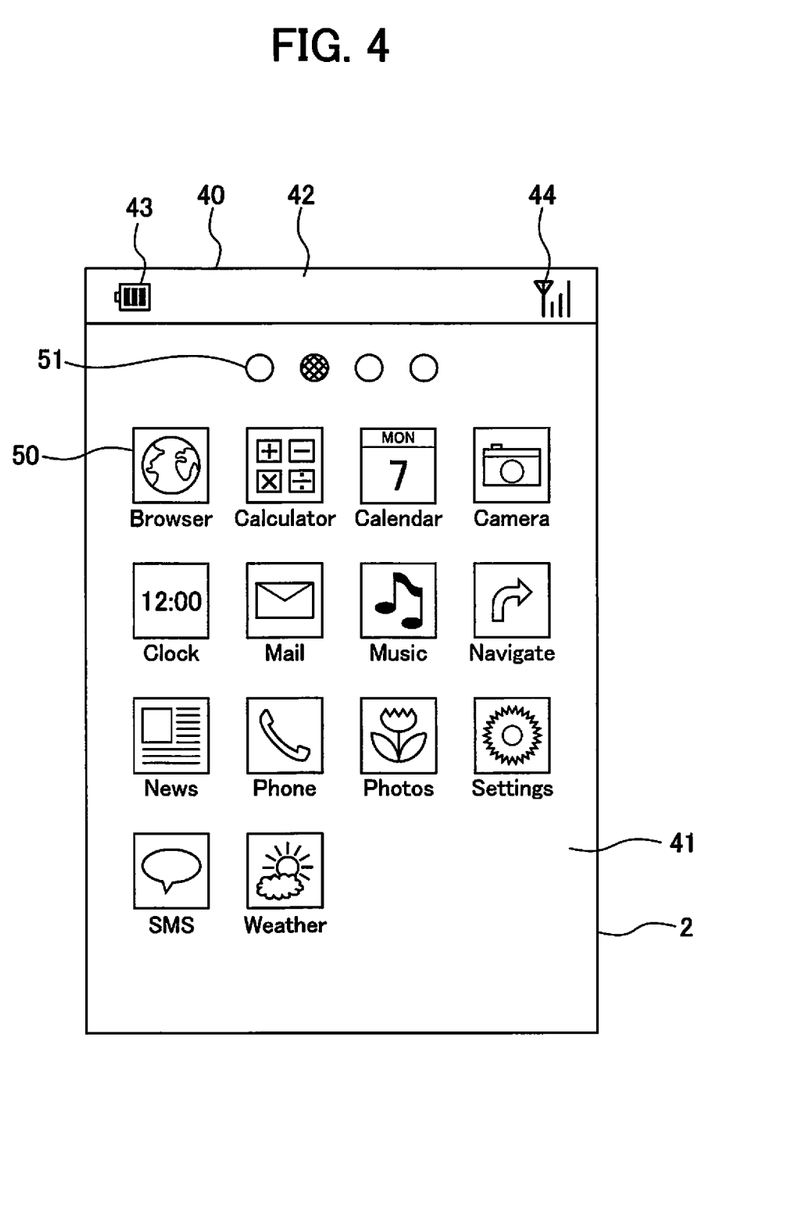
FIG. 4 is a diagram showing an example of a home screen of the smartphone according to a present embodiment.

An example of a screen displayed on the display 2A is described with reference to FIG. 4. FIG. 4 shows an example of a home screen. The home screen may be called a desktop or an idle screen. The display 2A can display the home screen. The home screen may be a screen for allowing the user to select which application is to be executed among applications installed in the smartphone 1. When an application is selected in the home screen, the smartphone 1 can execute the application in the foreground. Display can display a screen of a selected application executed in the foreground.

The smartphone 1 can arrange icons in the home screen. Shown in FIG. 4, a plurality of icons 50 are arranged in a home screen 40. Each icon 50 is associated with one of the applications, which is installed in the smartphone 1. When the smartphone 1 detects a gesture onto an icon 50, an application associated with the icon 50 is executed. For example, when the smartphone 1 detects a tap onto an icon 50 associated with a mail application, the mail application is executed. Here, for example, the smartphone 1 interprets the gesture onto a position (or a area), which corresponds to a displayed position (or displayed area) of the icon 50 on the touch-screen display 2, as an instruction to execute an application associated with the icon 50.

The icon 50 includes an image and a character string. The icon 50 may include a symbol or graphics in place of the image. The icon 50 need not include one of either the image or the character string. The icons 50 are arranged in accordance with a certain rule. Wall paper 41 is displayed behind the icons 50. The wall paper may also be called a photo screen or a back screen. The smartphone 1 can use an arbitrary image as the wall paper 41. An arbitrary image is determined as the wall paper 41, for example, in accordance with the setting by the user.

The smartphone 1 can increase and decrease the number of home screens. The smartphone 1 determines the number of home screens, for example, in accordance with the setting by the user. Even in a case in which a plurality of home screens are provided, the smartphone 1 selects a single home screen from the plurality of home screens, and displays the single home screen on the display 2A.

The smartphone 1 can display one or more locators on the home screen. The number of the locators coincides with the number of the home screens. The locator indicates the position of the currently displayed home screen. The locator corresponding to the currently displayed home screen is displayed in a manner different from the other locators.

Four locators 51 are displayed in an example shown in FIG. 4. This indicates that there are four home screens 40. In an example shown in FIG. 4, the second symbol (locator) from the left is displayed in a manner different from the other symbols (locators). This indicates that the second home screen from the left is currently displayed.

When the smartphone 1 can detect a particular gesture while displaying the home screen, the home screen displayed on the display 2A is switched. For example, when the smartphone 1 detects a rightward flick, the home screen displayed on the display 2A is switched over to the next home screen to the left. When the smartphone 1 detects a leftward flick, the home screen displayed on the display 2A is switched over to the next home screen to the right.

An area 42 is provided at the top edge of the display 2A. A remaining-level mark 43 indicating the remaining level of the rechargeable battery, and a radio wave level mark 44 indicating field intensity of radio waves for communication are displayed in the area 42. In the area 42, the smartphone 1 may display current time, weather information, active applications, type of communication standard, telephone status, device mode, events that occurred in the device, etc. In this way, the area 42 is used for making various notifications to the user. The area 42 may be provided as another screen separate from the home screen 40. The position at which the area 42 is provided is not limited to the top edge of the display 2A.

The home screen 40 shown in FIG. 4 is an example, and shapes of various elements, layouts of various elements, the number of home screens 40, and the manner of various operations on the home screen 40 need not be as described in the above descriptions.

Figure 5:
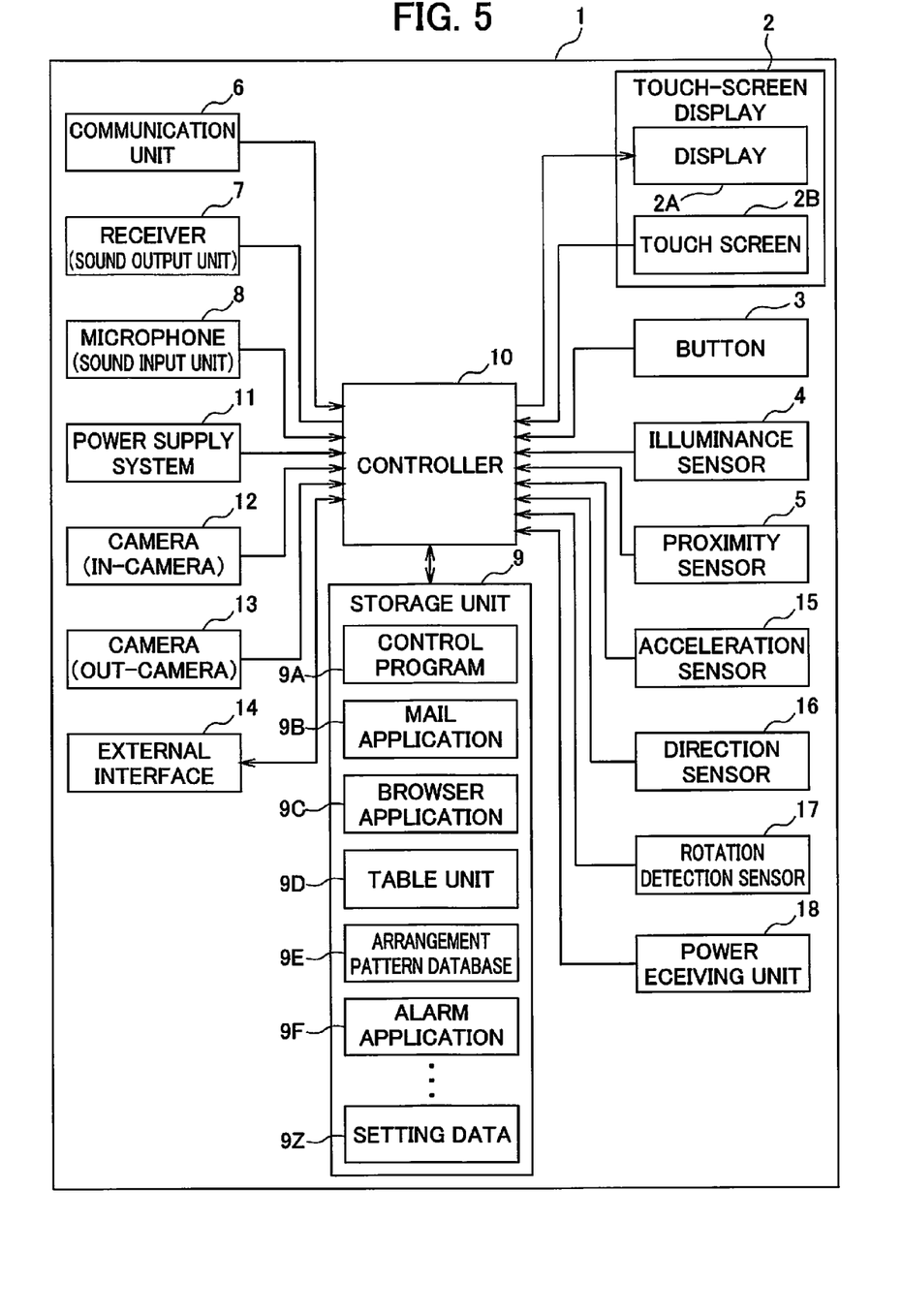
FIG. 5 is a block diagram showing functions of the smartphone according to a present embodiment.

FIG. 5 is a block diagram showing a configuration of the smartphone 1. The smartphone 1 may comprise the touch-screen display 2, the button 3, the illuminance sensor 4, the proximity sensor 5, a communication module 6, the receiver 7, the microphone 8, a storage module 9, a controller 10, the cameras 12 and 13, the external interface 14, an acceleration sensor 15, a direction sensor 16, and a rotation sensor 17.

As described above, the touch-screen display 2 has the display 2A and the touch screen 2B. The display 2A can display characters, images, symbols, graphics, etc. The touch screen 2B can detect a touch.

The button 3 is operated by the user. The button 3 has the buttons 3A to 3F. The controller 10 collaborates with the button 3 to detect an operation of the button. Operations of the button are, for example, a click, a double click, a push, and a multi-push.

For example, the buttons 3A to 3C are a home button, a back button or a menu button. For example, the button 3D is a power on/off button of the smartphone 1. The button 3D may also serve as a sleep/wake-up button. For example, the buttons 3E and 3F are volume buttons.

The illuminance sensor 4 can detect illuminance. For example, the illuminance includes intensity, brightness, brilliance, etc. of light. For example, the illuminance sensor 4 is used for adjusting the brilliance of the display 2A.

The proximity sensor 5 can detect presence of a proximate object in a contactless manner. The proximity sensor 5 detects, for example, a face being brought close to the touch-screen display 2.

The communication module 6 performs wireless communication. The communication module 6 functions as a first communication unit, and performs communication by the first communication standard. The first communication standard is a communication standard or the like conforming to cellular phone communication standards such as 2G, 3G and 4G. For example, the cellular phone communication standards include LTE (Long Term Evolution), W-CDMA, CDMA2000, PDC, GSM (registered trademark), PHS (Personal Handy-phone System), etc. Assumed in a present embodiment, the communication module 6 functions as the first communication module, and performs communication conforming to 3G (3G standard).

The communication module 6 also functions as a second communication module. The communication module 6 performs communication by the second communication standard. The communication module 6 is provided with, for example, both of the first communication module and the second communication module described above. The second communication standard comprises a wireless LAN standard, and includes, for example, a wireless communication standard conforming to IEEE 802.11. The second communication standard may support, for example, WiMAX (registered trademark) (Worldwide Interoperability for Microwave Access), WiFi (registered trademark) conforming to IEEE 802.11, Bluetooth (registered trademark), IrDA, NFC (Near Field Communication), etc. The second communication standard may be a communication standard different from the first communication standard described above. In a case in which the first communication standard is comprised a communication standard conforming to cellular phone communication standards such as 2G, 3G and 4G, the second communication standard may be comprised a communication standard different from the communication standard conforming to cellular phone communication standards such as 2G, 3G and 4G. Assumed in a present embodiment, the communication module 6 functions as the second communication unit, and performs communication conforming to Wi-Fi (Wi-Fi standard).

When a sound signal is transmitted from the controller 10, the receiver 7 outputs the sound signal as sound. The microphone 8 converts sound such as the user's voice into a sound signal, and transmits the sound signal to the controller 10. The smartphone 1 may further have a speaker(s) in addition to the receiver 7. The smartphone 1 may further have a speaker(s) in place of the receiver 7.

The storage module 9 can store programs and data. The storage module 9 may perform as a working area for temporarily storing processing results of the controller 10. The storage module 9 may include an arbitrary storage device such as a semiconductor storage device and a magnetic storage device. The storage module 9 may include several types of storage devices. The storage module 9 may include a combination of a portable storage medium such as a memory card with a reader for the storage medium.

The programs stored in the storage module 9 may include: applications that are executed in the foreground or the background; and a control program that assists operations of the applications. For example, an application causes the display 2A to display a certain screen, and causes the controller 10 to execute processing in accordance with a gesture detected by the touch screen 2B. The control program is, for example, an OS. The applications and the control program may be installed in the storage module 9 via wireless communication by the communication module 6 or via a storage medium.

The storage module 9 can store, for example, a control program 9A, a mail application 9B, a browser application 9C, and setting data 9Z. The mail application 9B provides electronic mail functions of creating, transmitting, receiving and displaying electronic mail. The browser application 9C provides a web browsing function of displaying web pages. A table module 9D stores various tables such as a key assignment table. An arrangement pattern database 9E stores patterns of arrangement such as arrangement of icons displayed on the display 2A. The setting data 9Z provides various set-up functions regarding operations of the smartphone 1.

The control program 9A provides functions regarding a variety of control for operating the smartphone 1. The control program 9A implements, for example, a telephone call function by controlling the communication module 6, the receiver 7, the microphone 8, etc. The functions provided by the control program 9A include functions of executing a variety of control such as changing the information displayed on the display 2A in accordance with a gesture detected via the touch screen 2B. The functions provided by the control program 9A may be utilized in combination with functions provided by other programs such as the mail application 9B.

The controller 10 may function as a control module. is the controller 10 may comprise, but not limited to a CPU (Central Processing Unit). The controller 10 may comprise, but not limited to an integrated circuit such as an SoC (System-on-a Chip) that integrates other constituent elements such as the communication module 6. The controller 10 can comprehensively control the operations of the smartphone 1 to implement various functions.

The controller 10 can implement various functions by referring to data stored in the storage module 9 as necessary, executing instructions included in a program stored in the storage module 9, and controlling the display 2A, the communication module 6, etc. The controller 10 may change the control in accordance with a result of detection by various detecting units such as the touch screen 2B, the button 3 and the acceleration sensor 15.

For example, the controller 10 can execute the control program 9A. The controller 10 can execute a variety of control. The variety of control may include changing the information displayed on the display 2A in accordance with a gesture detected via the touch screen 2B.

In an embodiment, the camera 12 may be an in-camera that photographs an object facing the front face 1A. In an embodiment, the camera 13 may be an out-camera that photographs an object facing the back face 1B.

The external interface 14 is a terminal to which another device is connected. The external interface 14 may be a universal terminal such as USB (Universal Serial Bus), HDMI (High-Definition Multimedia Interface), Light Peak (may be called Thunderbolt), or an earpiece-microphone connector. The external interface 14 may be a terminal designed for exclusive use, such as a Dock connector. A device that is connected to the external interface 14 includes, for example, an external storage unit, a speaker, or a communication device.

The acceleration sensor 15 can detect direction and level of acceleration that acts on the smartphone 1. The direction sensor 16 can detect geomagnetic orientation. The rotation sensor 17 can detect rotation of the smartphone 1. Results of such detection by the acceleration sensor 15, the direction sensor 16 and the rotation sensor 17 are utilized in combination to detect change in the position and posture of the smartphone 1.

The smartphone 1 as thus constituted can enhance the convenience of communication by a wireless communication standard conforming to IEEE 802.11, such as Wi-Fi. A specific configuration is described below.

The controller 10 can use the communication module 6 to search for a base station of Wi-Fi, based on a traffic of a communication by 3G. The controller 10 can measure the traffic of communication by 3G in the communication module 6. Subsequently, in a case in which the traffic of communication by 3G is at least a first value, the controller 10 can search for a base station of Wi-Fi. The first value is a curtain value.

Here, the traffic of communication refers to, for example, the amount of data received or transmitted per unit time, or a maximum value of the amount of data received or transmitted per unit time. Alternatively, the traffic of communication refers to the total amount of communication per unit time; an average value of the total amount of communication per unit time; or a maximum value of the amount of data received or transmitted per unit time. Here, the total amount of communication is composed of the sum of the amount of data received (received amount) and the amount of data transmitted (transmitted amount).

For example, in a case in which the amount of data received or transmitted per unit time exceeds the first value, or in a case in which the maximum value of the amount of data received or transmitted per unit time exceeds the first value, the controller 10 can search for a base station of Wi-Fi. In 3G communication, for example, in a case in which the total amount of communication per unit time exceeds the first value, in a case in which the average value of the total amount of communication per unit time exceeds the first value, or in a case in which the maximum value of the amount of data received or transmitted per unit time exceeds the first value, the controller 10 can search for a base station of Wi-Fi. The first value may differ in each of: the amount of data received or transmitted per unit time; the maximum value of the amount of data received or transmitted per unit time; the total amount of communication per unit time; the average value of the total amount of communication per unit time; and the maximum value per unit time.

The smartphone 1 enables Wi-Fi communication by searching for a base station of Wi-Fi, based on traffic of communication by 3G. Thus, for example, in a case in which traffic of communication by 3G is heavy, the smartphone 1 can switch the communication by searching for a base station of Wi-Fi; therefore, the convenience of Wi-Fi communication can be enhanced.

In a case in which a base station of Wi-Fi is searched for and found, the controller 10 can control the communication module 6 to establish communication connection with the base station. The controller 10 can switch the 3G communication to Wi-Fi communication. In a case in which the 3G communication performed by the communication module 6 is switched to Wi-Fi communication, the controller 10 can maintain the connected state between the communication module 6 and the base station of Wi-Fi, even if the communication is completed.

In a case in which a base station of Wi-Fi is found, the smartphone 1 can switch the 3G communication to Wi-Fi communication; therefore, the traffic of communication by 3G can be curtailed. Even if the communication is completed, the smartphone 1 can maintain the connected state between the communication module 6 and the base station of Wi-Fi; therefore, upon resuming the communication, the Wi-Fi communication is performed as it is. Thus, the smartphone 1 can further enhance the convenience of Wi-Fi communication.

In a case in which a base station of Wi-Fi is searched for and found, if the transmission rate utilizing the base station is higher than a certain rate, the controller 10 switches the 3G communication to Wi-Fi communication. In this case, if the transmission rate utilizing the base station is lower than a certain rate, the controller 10 maintain the 3G communication.

The controller 10 can measure the transmission rate in a case of utilizing a base station of Wi-Fi, as follows. In a case in which a base station of Wi-Fi is found, the controller 10 can establish a communication connection with the base station, and can subsequently transmit and receive a certain volume of dummy data with respect to an external server through the base station. The controller 10 can measure the transmission rate based on the time required for transmission and reception of the dummy data. Thus, the smartphone 1 can switch 3G communication to Wi-Fi communication based on the transmission rate.

In a case in which a base station of Wi-Fi is searched for and found, the controller 10 determines whether the power consumption consumed in a Wi-Fi communication is lower than the power consumption consumed in a the 3G communication. In a case in which the controller 10 determines that the power consumption consumed in a case of switching to Wi-Fi communication is lower, the controller 10 switches the 3G communication to the Wi-Fi communication.

In the other words, the controller 10 can determine which one of communications do not need more electric power consumption between before switching and after switching. And the controller 10 can switch the first and second communication modules.

The controller 10 can determine the electric power consumption as follows. Even while performing Wi-Fi communication, the smartphone 1 can continue the 3G communication by receiving, for example, intermittent signals on standby for an incoming call. Therefore, the controller 10 can calculate the total value of the power consumption consumed in Wi-Fi communication and the power consumption consumed in 3G communication, and determines the total value as the power consumption consumed in performing Wi-Fi communication.

The controller 10 can calculate communication termination time, based on the size of data to be received or transmitted and the transmission rate of Wi-Fi communication. The controller 10 calculates the total value of the power consumption consumed in Wi-Fi communication and the electric power consumed in 3G communication until the communication termination time, and determines the total value as the power consumption consumed in performing Wi-Fi communication.

On the other hand, in a case in which the 3G communication is continued as it is, the controller 10 can calculate the power consumption consumed in the 3G communication. Here, the controller 10 can calculate a time for terminating communication, based on the size of data to be received or transmitted, and the transmission rate of 3G communication, and calculates the power consumed in the 3G communication until the time for terminating communication.

The controller 10 compares the calculated electric power consumption, thereby determining whether the electric power consumption becomes lower by switching the 3G communication to Wi-Fi communication.

Thus, the smartphone 1 can switch 3G communication to Wi-Fi communication, based on electric power consumption.

In a case in which a base station is searched for but not found, the controller 10 controls the communication module 6 to discontinue searching for the base station. Subsequently, when a certain period of time has elapsed after the discontinuance, the controller 10 measures the traffic of communication by the first communication module after the discontinuance. In a case in which the measured traffic of communication is at least a second value, the controller 10 searches for the base station again. The controller 10 measures the traffic of communication by using dummy data as described above. Here, the second value may be greater than the first value, may be smaller than the first value, or may be the same as the first value.

In this manner, the smartphone 1 can control the researching of the base station, based on how the communication is continued.

The controller 10 functions as a calculating module. The calculating module can calculate a movement distance of the smartphone 1. For example, the controller 10 calculates the movement distance, based on acceleration detected by the acceleration sensor 15, or based on a GPS signal received through the communication module 6.

A base station is searched for but not found, the controller 10 discontinues searching for the base station. In a case in which a three condition is satisfied, (1) certain period of time has elapsed after a discontinuance, (2) the movement distance after the discontinuance is at least a certain value, and (3) the traffic of communication performed by the communication module 6 is at least the second value after the discontinuance, the controller 10 searches for a base station again.

In this manner, the smartphone 1 can control the researching for the base station, based on how the smartphone 1 itself is moved.

Figure 6:
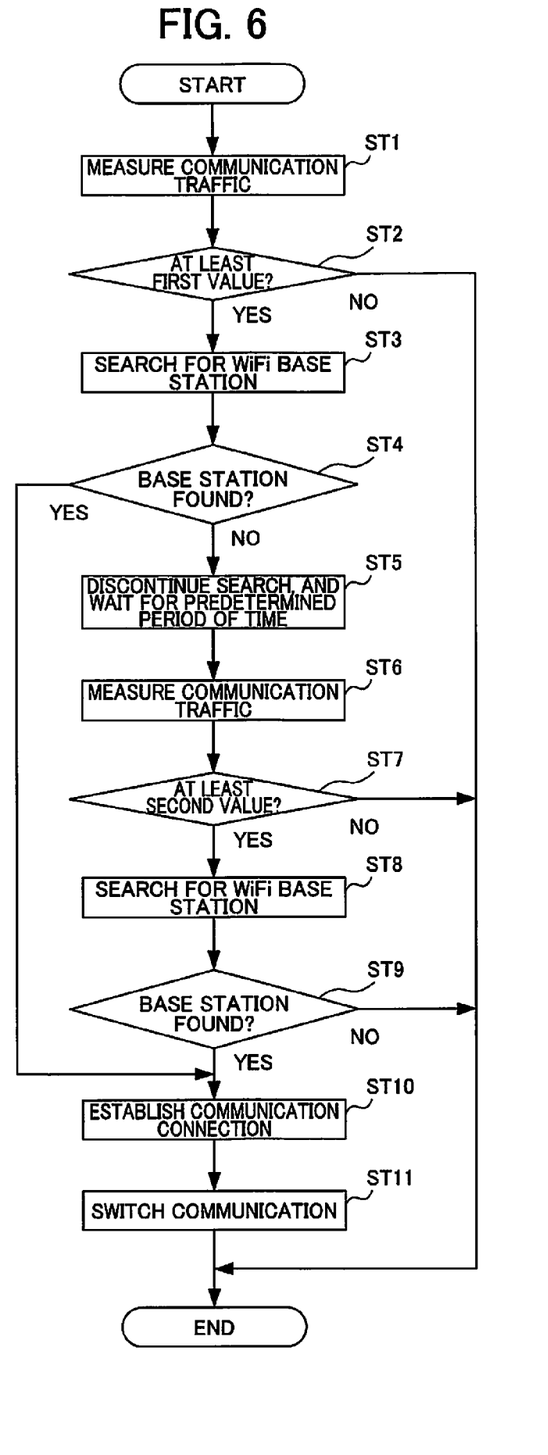
FIG. 6 is flowchart showing operational flow of the smartphone according to a present embodiment.

Next, operational flow of the smartphone 1 is described with reference to a flowchart shown in FIG. 6.

In Step ST1, the controller 10 measures the traffic of communication.

In Step ST2, the controller 10 determines whether the traffic of communication measured in Step ST1 is at least the first value. In a case in which the determination is YES, the controller 10 advances the processing to Step ST3; and in a case in which the determination is NO, the controller 10 terminates the processing in the present flowchart.

In Step ST3, the controller 10 searches for a base station of Wi-Fi. In Step ST4, the controller 10 determines whether a base station is found. In a case in which the determination is YES, the controller 10 advances the processing to Step ST10; and in a case in which the determination is NO, the controller 10 advances the processing to Step ST5.

In Step ST5, the controller 10 discontinues searching for the base station, and waits for a predetermined period of time. In Step ST6, the controller 10 measures communication traffic.

In Step ST7, the controller 10 determines whether the communication traffic measured in Step ST6 is at least the second value. In a case in which the determination is YES, the controller 10 advances the processing to Step ST8; and in a case in which the determination is NO, the controller 10 terminates the processing in the present flowchart.

In Step ST8, the controller 10 searches for a base station of Wi-Fi. In Step ST9, the controller 10 determines whether a base station is found. In a case in which the determination is YES, the controller 10 advances the processing to Step ST10; and in a case in which the determination is NO, the controller 10 terminates the processing of the present flowchart.

In Step ST10, the controller 10 controls the communication module 6 to establish Wi-Fi communication. In Step ST11, the controller 10 switches the 3G communication to Wi-Fi communication.

As described above, according to a present embodiment, the smartphone 1 enables Wi-Fi communication by searching for a base station of Wi-Fi, based on the traffic of 3G communication. Thus, for example, in a case in which the traffic of 3G communication is heavy, the smartphone 1 can switch the communication by searching for a base station of Wi-Fi; therefore, the convenience of Wi-Fi communication can be enhanced.

Some embodiments of the present disclosure has been described above; however, the present disclosure is not limited to an aforementioned embodiments. Effects arising from the present disclosure are not limited to those described in the aforementioned embodiments.

In a above embodiment, in a case in which the traffic of the 3G communication is at least the first value, the controller 10 searches for a base station of Wi-Fi; however, it is not limited thereto. For example, the storage module 9 may store a plurality of stepwise values in place of the first value. The controller 10 may select a single value from the plurality of values, based on the 3G communication rate. The controller 10 may search for a base station of Wi-Fi, in a case in which the traffic of the 3G communication is at least the selected value. For example, in a case in which the transmission rate of the 3G communication is decreased by congestion, the controller 10 may select the lowest value from the plurality of stepwise values; and in a case in which the traffic of the 3G communication is at least the selected value, the controller 10 may search for a base station of Wi-Fi.

The invention claimed is:

1. A portable electronic device, comprising:
a first communication module configured to perform communication by a first communication standard;
a second communication module configured to perform communication by a second communication standard; and
a control module configured to use the second communication module to search for a base station, based on a traffic of communication performed by the first communication module,
wherein
the traffic of the communication includes volume of the communication,
the control module is configured to use, in a case in which the volume of the communication is at least a first value, the second communication module to search for the base station,
wherein, in a case in which the base station is not found, the controller discontinues searching for the base station, and
wherein, in a case in which a certain period of time has elapsed after a discontinuance, and the value of communication by the first communication module is at least a second value after the discontinuance, the control module is configured to search for the base station again.

2. The portable electronic device according to claim 1, wherein,
in a case in which the base station is found by searching, the control module is configured to shift from communication by the first communication module to communication by the second communication module.

3. The portable electronic device according to claim 2, wherein,
in a case in which the control module is configured to shift from the communication by the first communication module to the communication by the second communication module, the control module is configured to maintain a connected state between the second communication module and the base station, even if the communication is completed.

4. The portable electronic device according to claim 1, wherein,
in a case in which the base station is found by searching, and a transmission rate utilizing the base station is higher than a certain rate, the control module is configured to shift from communication by the first communication module to the communication by the second communication module.

5. The portable electronic device according to claim 1, wherein the second value differs from the first value.

6. A portable electronic device, comprising:
a first communication module configured to perform communication by a first communication standard;
a second communication module configured to perform communication by a second communication standard;
a control module configured to use the second communication module to search for a base station, based on a traffic of communication performed by the first communication module,
wherein
the traffic of the communication includes volume of the communication,
the control module is configured to use, in a case in which the volume of the communication is at least a first value, the second communication module to search for the base station; and
a calculating module configured to calculate a distance, the portable electronic device moved the distance,
wherein, in a case in which the base station is searched for but not found, the control module discontinues searching for the base station, and
wherein, in a case in which a certain period of time has elapsed after the discontinuance, the distance after the discontinuance is at least a certain value, and the value of communication performed by the first communication module is at least the second value after the discontinuance,
the control module searches for the base station again.

7. The portable electronic device according to claim 6, wherein,
in a case in which the base station is found by searching, the control module is configured to shift from communication by the first communication module to communication by the second communication module.

8. The portable electronic device according to claim 6, wherein,
in a case in which the base station is found by searching, and a transmission rate utilizing the base station is higher than a certain rate, the control module is configured to shift from communication by the first communication module to the communication by the second communication module.

9. A portable electronic device, comprising:
a first communication module configured to perform communication by a first communication standard;
a second communication module configured to perform communication by a second communication standard; and
a control module configured to use the second communication module to search for a base station, based on a traffic of communication performed by the first communication module,
wherein
the control module is configured to shift, in a case in which the base station is searched by searching, and second power consumption is lower than first power consumption, from communication by the first communication module to the communication by the second communication module,
the first power consumption is consumed in a communication by the first communication module,
the second power consumption is consumed in a communication by the second communication module,
the first communication module is configured to communicate by cellular phone communication standards,
the second communication module is configured to communicate by other communication standard, and
the second power consumption further includes a power consumption in an intermittent communication by the first communication module.

10. A portable electronic device, comprising:
a first communication module configured to perform communication by a first communication standard;
a second communication module configured to perform communication by a second communication standard; and
a control module configured to use the second communication module to search for a base station, based on a traffic of communication performed by the first communication module,
wherein
the traffic of the communication includes volume of the communication,
the control module is configured to use, in a case in which the volume of the communication is at least a first value, the second communication module to search for the base station,
in a case in which the base station is not found, the control module is configured to discontinue searching for the base station,
in a case in which a certain period of time has elapsed after a discontinuance of search, the control module is configured to measure the traffic of communication by the first communication module after the discontinuance of search and to obtain a second value, and
in a case in which the second value is different from the first value, the control module is configured to search for the base station again.

11. The portable electronic device according to claim 10, wherein,
in a case in which the base station is found by searching, the control module is configured to shift from communication by the first communication module to communication by the second communication module.

12. The portable electronic device according to claim 10, wherein, in a case in which the base station is found by searching, and a transmission rate utilizing the base station is higher than a certain rate, the control module is configured to shift from communication by the first communication module to the communication by the second communication module.

* * * * *